Patented Feb. 5, 1929.

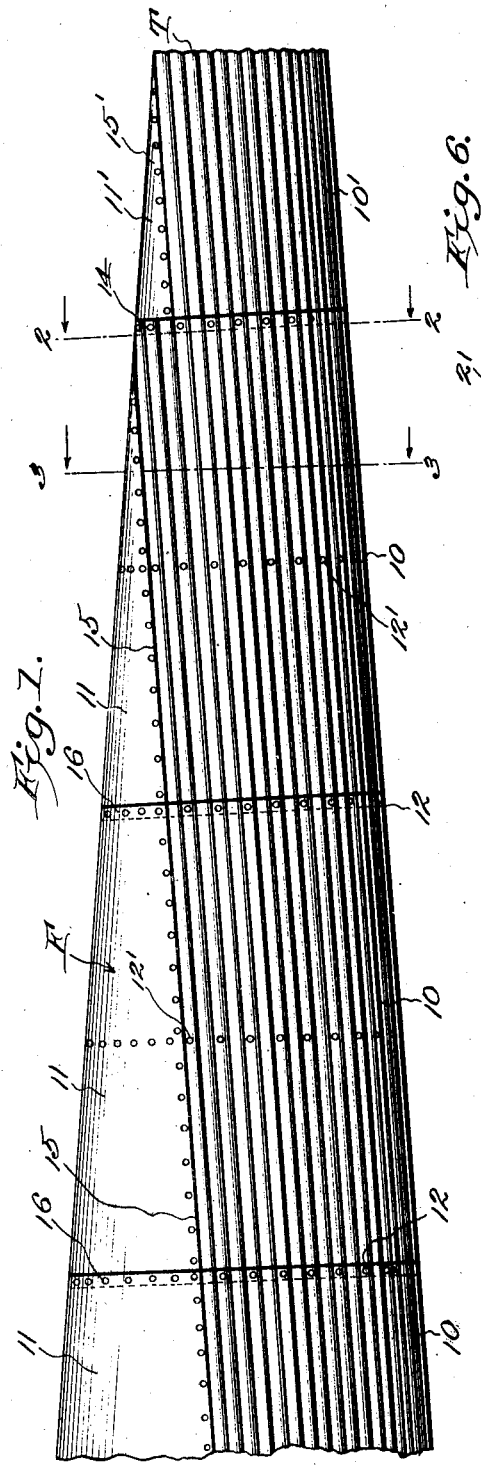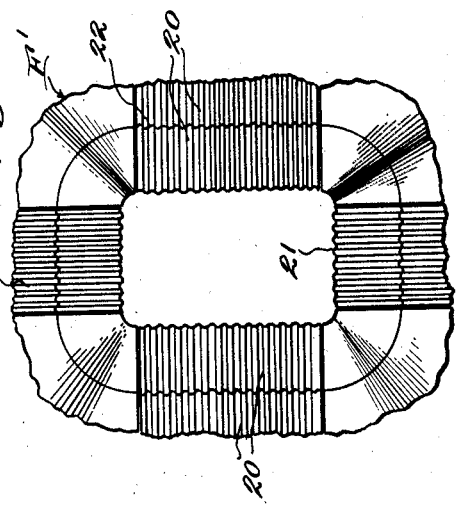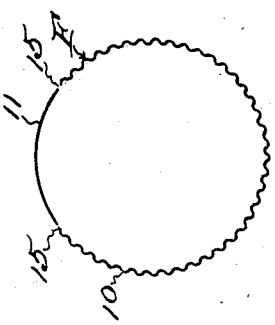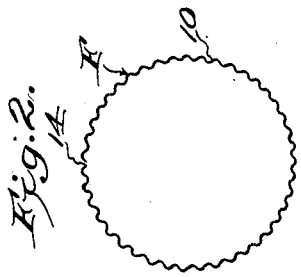

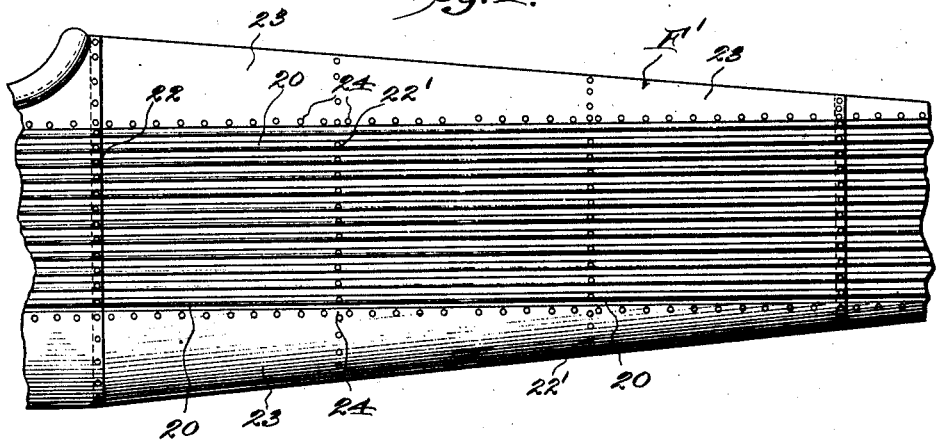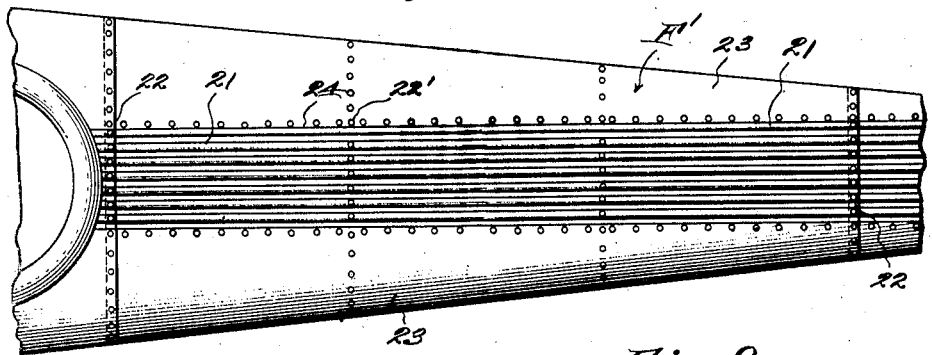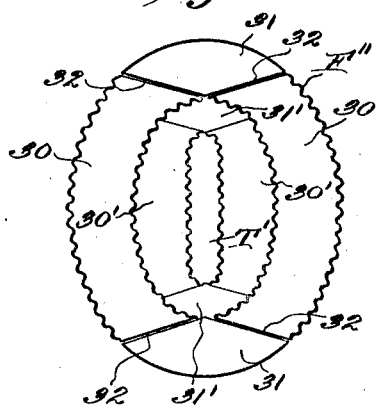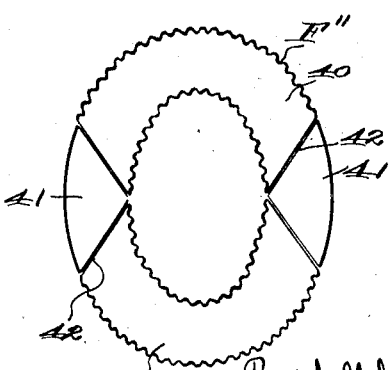

1,701,451

UNITED STATES PATENT OFFICE.

RANDOLPH F. HALL AND CHARLES AINSLEY PHILLIPS, OF ITHACA, NEW YORK, ASSIGNORS, BY DIRECT AND MESNE ASSIGNMENTS, OF THREE-FOURTHS TO SAID RANDOLPH F. HALL AND ONE-FOURTH TO THEODORE P. HALL, OF WALLINGFORD, CONNECTICUT.

AIRPLANE.

Application filed June 3, 1926. Serial No. 113,447.

This invention relates to certain improvements in airplanes; and the nature and objects of the invention will be readily recognized by those skilled in the arts involved from the following explanation and detailed description of the accompanying drawings illustrating what we at present consider to be the preferred embodiments or aerodynamical and mechanical expressions of our invention from among various other forms, arrangements, combinations and constructions of which the invention is capable within the spirit and scope thereof.

More specifically the invention treats of certain problems and difficulties met with in the design and construction of aircraft elements of those types including and embodying a metal enclosing skin or covering, such as fuselages, nacelles, built-up hollow girders and the like, and particularly in the application and securing of a metal skin or covering of the corrugated type to and on such elements when of the tapered or varying cross sectional forms.

Aircraft elements or bodies of the metal skin or covering enclosed types, referred to generally as monocoque construction, usually embody a series of transverse contour formers or similar frame members to and over and across which the metal skin or covering of either the smooth, plain type or the corrugated type, in the form of metal sheet, is secured and attached. If the skin or covering is formed from smooth metal sheet it is generally necessary to employ local stiffening members for the skin and to use a metal sheet of greater thickness and weight than the corrugated sheet, but if corrugated sheet is utilized to form the enclosing skin or covering the local stiffening members can be dispensed with and a thinner and lighter weight metal sheet used. The smooth sheet is more easily applied and attached with resulting increase in production and decrease in cost, but the corrugated sheet is generally preferred because of the decrease in weight and increase in strength, with the exception that the cost of production is greater due to the difficulties encountered in corrugating, and in applying and securing the same on and to the element frame.

In applying and attaching corrugated sheet to and over an aircraft element or body of the tapered or varying section type to form the enclosing skin or covering therefor, difficulty is encountered in matching the corrugations of the applied metal sheets at the joints or splices therebetween, as well as in forming a suitable and efficient longitudinal seam or joint along the body between the metal sheets due to the fact that the corrugations are irregular and are difficult to match or lap because of the taper or variations in section of and along a body or element. As a result of these problems and difficulties attendant the use of corrugated metal sheet as a skin or covering, the time and cost of production is increased and the uniformity and efficiency of the joints or seams between the sheets are apt to be decreased.

The present invention practically eliminates and materially reduces the foregoing problems and difficulties attendant the use of corrugated metal skin or covering for aircraft elements or bodies of the types referred to, and permits of the utilization thereof without increasing the time or cost of production over smooth sheet, while retaining all the material advantages in light weight, strength, and efficiency of corrugated metal skin or covering for such elements.

A characteristic of the invention resides in a design and construction of corrugated metal skin or covering formed from long sheets for aircraft elements of the tapered or varied section forms.

Another characteristic of the invention resides in the provision of a corrugated metal skin or covering for aircraft elements of the longitudinally tapered or varying section forms, in which the corrugations are all disposed substantially parallel to the longitudinal axis of the element irrespective of the taper or varying section of the element.

A further characteristic resides in the provision of a design and arrangement of a corrugated metal skin or covering for aircraft elements of the tapered or varying section forms, in which the corrugations are disposed longitudinally of an element and are constant in number, so that the skin can be formed of sheets or strips and the corrugations matched and lapped to form efficient joints or splices between the metal sheets.

A further characteristic of the invention consists in a design and construction of corrugated metal skin or covering for tapered and the like aircraft elements, in which the corrugations are disposed longitudinally of an element and are constant in number and total width, and the peripheral increase in the element due to the taper or variations in section is compensated for and taken up by smooth metal skin or covering sections or areas forming part of and completing the skin or covering.

With the foregoing main characteristics, and certain other characteristics and objects in view, which will be readily apparent and understood by those familiar with this art from the following explanation, the invention consists in certain novel features in construction and in combinations and arrangements of parts, as will be more fully and particularly referred to and specified hereinafter.

Referring to the accompanying drawings, in which similar reference characters refer to corresponding parts throughout the several figures thereof:

Fig. 1, is a view in side elevation of a portion of an airplane fuselage or body of substantially cylindrical tapered section, formed with a corrugated metal skin in accordance with the invention.

Fig. 2, is a vertical transverse section taken on the line 2—2, of Fig. 1.

Fig. 3, is a vertical transverse section taken on the line 3—3 of Fig. 1.

Fig. 4, is a side elevation of a portion of an airplane fuselage or body of tapered form substantially rectangular in section and embodying a corrugated metal skin constructed and applied in accordance with the invention.

Fig. 5 is a top plan view of the fuselage of Fig. 4.

Fig. 6, is a vertical transverse section through the fuselage of Figs. 4 and 5, taken on the line 6—6 of Fig. 4.

Fig. 7, is a transverse vertical section taken through a fuselage or body of tapered form substantially oval in section, showing another form and arrangement of corrugated metal skin thereon embodying the invention.

Fig. 8, is a transverse section through a fuselage of the type of Fig. 7 but showing still another form and arrangement of the corrugated metal skin or covering therefor.

By way of example and not of limitation, for purposes of explanation, the principles and features of the invention are presented in the accompanying drawings and described herewith as embodied in airplane fuselages or bodies of the so-called metal monocoque types, but the disclosed examples are selected because in these types of aircraft elements the problems and difficulties solved and overcome by the invention are found in accentuated form and hence they serve to more fully bring forth and exemplify the invention. However, it is to be understood that the invention is not restricted to embodiment in and to airplane bodies, but is applicable generally to the skin or covering of any and all aircraft elements where similar or equivalent conditions are encountered, and the invention contemplates and includes such general, broad applications and uses.

A type of metal monocoque airplane fuselage or body F is disclosed in Figs. 1, 2 and 3 of the accompanying drawings, of the substantially cylindrical section, longitudinally tapered form, consisting of a suitable frame embodying, for example, a series of spaced, transverse frame members or contour formers (not shown) covered and enclosed in a metal skin or covering riveted thereon and thereover as indicated. This metal skin or covering is usually formed of sheets or strips which are generally riveted to the fuselage formers. The edges of adjacent strips or sections are overlapped and riveted together, and where corrugated sheet is employed the difficulties hereinbefore explained with reference to matching corrugations and forming seams and joints between the corrugated sheets, are encountered because of the taper and varying diameters longitudinally along the fuselage.

In accordance with the broad principles of the invention applied to a fuselage or body F of the type shown, the metal skin or covering is formed of the corrugated strips or sections 10, and the smooth plain sheets or inserts 11, completing the enclosing skin with the corrugated sheets or sections 10. These corrugated sheets 10 are formed of the same size and each with the same number of corrugations, and in the example of Fig. 1, although not so limited, are placed over the under side of the fuselage and bent upwardly around and covering the opposite sides, with the edges of adjacent sheets or sections overlapped and riveted or otherwise secured together to form the joints or seams 12 and provide the major portion of the skin or covering. The section or sheet 10 at the rear or tail portion of fuselage F is of such dimensions as to have the rear upper edges thereof substantially meet or lap at 14 with the sheet in position attached on and around the fuselage, and the body of the sheet extending forwardly with the longitudinal or horizontal edges extending forwardly along the fuselage longitudinally thereof and spaced an increasing distance apart and from the upper or intervening side of the fuselage, due to the taper or forwardly increasing section or diameter, as will be clear by reference to Fig. 1 of the drawings. The adjacent or next sheet or section 10 forwardly of rear section 10 is lapped over the forward edge of such rear section to form the joint or seam 12, and extends forwardly along and around the fuselage in continuation of the rear sheet with the corrugations of the sheets matched, due to the fact that the sheets 10 are of the same size and formed with an equal number of corrugations. This construction and arrangements of the corrugated sheets 10 is carried out forwardly along the fuselage, with the gap between the longitudinal edges of the sheets increasing forwardly due to the body taper but with the corrugations of the sheets matching and alined longitudinally of and along the fuselage, and the upper or spaced edges of the sheets alined along and longitudinally of opposite sides of the fuselage F. In this manner the major portion of the fuselage skin is formed corrugated with the number and width of the corrugations constant longitudinally along, and irrespective of the taper of, the fuselage.

The gap or space between the alined opposite side edges of the corrugated sheets 10 is filled in and the fuselage skin completed by the smooth or plain metal sections or inserts 11, one to each section 10, in the example hereof, and cut to fit and occupy the space between the edges of each section 10, respectively, with the longitudinal edges of these smooth metal inserts 11 lapped with and secured, as by riveting, to the adjacent edges of the sections or sheets 10 to form therewith the longitudinal joints or seams 15 along the opposite sides of the fuselage. The adjacent transverse or front and rear edges of the smooth sections or inserts 11 are lapped and secured together to form the joints 16 therebetween, in this instance forming continuations of the joints 12 between the corrugated sections. With sections 10 of the corrugated sheet, the smooth sections or inserts 11 form and complete the fuselage skin or covering which is corrugated for and over the major portion thereof to secure the mentioned advantages from corrugated sheet and aerodynamic efficiency from substantially continuous unbroken corrugations disposed longitudinally of the fuselage in the line of airflow. The corrugations of sheets or sections 10 are constant in number and readily match at all lapped joints therebetween, while the difficulties of joining the longitudinal edges of sections or sheets along the fuselage, due to unmatched corrugations, are eliminated by the alined spaced longitudinal edges of corrugated sections 10 lapping with and secured to the edges of the smooth inserts 11 in the formation of the longitudinal seams 15. The sheets 10 and inserts 11 are preferably riveted intermediate seams 12 to contour formers (not shown) or other elements of the fuselage as indicated at 12'.

The rearmost corrugated section 10 can be applied and secured at and extending forwardly from the extreme tail portion or rear end of the body or fuselage, or as in Fig. 1 of the drawings, the foregoing arrangement of the corrugated plate or sheet and smooth sheet can be applied in rearward continuation or progression to provide the tail piece or end T of the fuselage F. Preferably, although not necessarily, the tail section T embodies a usual or other framework (not shown) as a part of the fuselage frame, and a corrugated sheet or strip 10' is secured thereon, in a manner similar to sections 10, but the corrugated sheet 10' is of less width than sections 10, and is designed to approximately meet or lap at the rear corners or edges and then extend forwardly to rear section 10, with the spaced edges disposed longitudinally of the fuselage below the upper or outer side thereof, and sheet 10' lapped and jointed with rear sheet or section 10 at 14, with the corrugations of rear sheet 10 and sheet 10' matched. The gap or space between the longitudinal edges of sheet 10' is filled by the smooth metal section or insert 11', which is lapped with section 10' to form the longitudinal joints or seams 15', and with the rear edge of rear section or sheet 10 to form a part of the transverse joint or seam 14. The foregoing feature of progression can be carried out or repeated a plurality of times in constructing the fuselage skin or covering, but is of particular utility in forming the tail piece or section where it is desired or expedient to sharply decrease or change the fuselage taper or section.

In the example of Fig. 1, the smooth metal sections or inserts 11, or 11' can be formed integral with and divided between the opposite sides of the corrugated sections 10, or 10', so as to consolidate the longitudinal side seams or joints 15, or 15', and form a single longitudinal joint along the fuselage. Again, it is not intended to limit the sections 10 or 11, or 10' and 11', to formation of a single sheet or section, as they can be formed of a plurality of sheets or sections in building up the skin or covering, as will be readily understood, without departing from the basic feature of longitudinally alined corrugations matching at joints or seams throughout the fuselage skin or covering.

A form of fuselage or body F' is shown by Figs. 4, 5 and 6 of the drawings with a skin or covering applied and arranged thereon according to the principles of the invention. The fuselage F' is substantially rectangular in cross section and tapered longitudinally. The skin or covering therefor embodies a series of corrugated metal sections or sheets 20 of equal width and formed with the same number of corrugations. The corrugated sections 20 are preferably, although not so limited, of a width approximately equal to the minimum depth or side height of the fuselage F', which usually occurs at the tail portion, and are secured along opposite sides of the fuselage with the corrugations disposed longitudinally or horizontally, from the point of minimum depth forwardly, with the adjacent edges of the sections lapped and secured together to form the joints or seams 22 therebetween, transversely of the fuselage. By the design and arrangement, the corrugations of the sections 21 match at the joints 22 and are longitudinally alined along opposite sides of the fuselage, and form corrugated side portions of the skin constant in the number and total width of the corrugations. A similar arrangement of corrugated sections 21, are secured over and longitudinally along the upper and lower sides of fuselage F', which sections are formed with an equal width and the same number of corrugations matched at the lapped edges of the sections and secured together to form the joints 22 therebetween. The upper and lower sections are of the same length as the corrugated side sections 20 so the joints 22 therebetween are alined, and are of a width substantially equal to the minimum width of fuselage F' and these sections 21 form a series of alined, matched and longitudinally disposed corrugations along and forming the major portion of the skin at the upper and lower sides of the fuselage, as will be clear by reference to Fig. 5 of the drawings.

The forwardly increasing longitudinally disposed gaps or spaces between the corrugated side sections 20 and 21, formed by the rearward taper of the fuselage F', are filled by curved smooth metal sections or inserts 23. These smooth metal sections 23 are cut and designed to fit and extend between adjacent spaced edges of the corrugated side sections 20 and the upper and lower corrugated sections 21, and lap with the edges of the corrugated sections 21 and 22 and are secured thereto, as by riveting to form the alined continuous longitudinal joints or seams 24. The smooth metal sections 23 are in this instance of the same length as the respective corrugated sections which they connect and between which they extend and are overlapped at their adjacent edges where they are secured together to form joints or seams in continuation of the transverse joints 22 between the corrugated sections 20 and 21. In this manner the smooth sections or inserts 23 form and complete the enclosing skin or covering for the fuselage F', with the corrugated sections. In the form of fuselage skin or covering disclosed in Figs. 4, 5 and 6 the major portion thereof is corrugated with the corrugations disposed longitudinally of the fuselage in the direction of airflow and are constant in number and total width along each side of the fuselage respectively. At intermediate points the sections 20, 21 and 23 are preferably riveted to formers (not shown) of the fuselage as shown at 22'. By this construction the advantages of corrugated skin is retained and the disadvantages hereinbefore mentioned eliminated. The strength of the skin or covering is not materially decreased by the smooth metal inserts because of the fact that these inserts or sections 23 are curved and thus given greater strength in the position as portions of the skin. Preferably the corrugated sections 20 and 21 are of considerable length with respect to the fuselage length, so as to reduce the number of joints 22 between sections.

The construction and arrangement of the skin or covering for the fuselage type of Figs. 4 to 6 is shown as constructed of a series of smooth and corrugated sections but it is to be understood that the invention also contemplates and includes various other arrangements or divisions of the skin or covering, such for example as sheets formed both corrugated and smooth to eliminate and reduce longitudinal seams between the smooth and corrugated sheets as well as other arrangements.

In Figs. 7 and 8 of the drawings a metal monocoque fuselage of longitudinally tapered form which is oval in cross section is disclosed and on which a metal skin or covering is secured in accordance with the principles of the invention. These figures are transverse sections purely diagrammatic to illustrate the construction of the skin or covering arrangement therefor.

The skin arrangement of Fig. 7 embodies the opposite side corrugated metal sections or sheets 30 which are longitudinally corrugated and present a constant number of corrugations throughout their length. The corrugated sheets or sections 30 are applied on opposite sides of the fuselage and are of a width such that at the rear or tail end portion of the fuselage they extend completely therearound and substantially meet or lap at their rear upper and lower corners or edges, as will be clear by reference to Fig. 7. The opposite side sheets 30 extend forwardly and longitudinally along opposite sides of the fuselage with the space or gap between adjacent longitudinal edges thereof increasing forwardly due to the taper of the fuselage but with the corrugations disposed longitudinally along the fuselage in the direction of airflow. Between the spaced upper longitudinal edges of the opposite sections 30 a smooth metal section or insert 31 is mounted and secured extending between and joined along its longitudinal edges with the longitudinal edges of the sections 30 to form the joints or seams 32. Similarly a smooth metal section or insert 31 is fitted and secured between the spaced longitudinal edges of sections 30 at the under or lower side of the fuselage and is secured to sections 30 to provide the longitudinal seams 32. In this manner a substantially corrugated metal covering is provided for the fuselage in which the number of corrugations is constant along the length of the fuselage between sections or sheets of which sections 30 may be formed and the taper of the fuselage is taken up and compensated for by the smooth metal section inserts 31 extending between the spaced longitudinal edges of corrugated sections 30 at the upper and lower sides of the fuselage.

If desired or found expedient a rear or tail end section T' can be provided for the fuselage F''' of Fig. 7, in accordance with and similar to the tail section T referred to and explained with reference to Fig. 1 of the drawings. In this instance the tail section T' is similar to the skin or covering construction disclosed with reference to Fig. 7 and embodies the opposite side corrugated sections 30' with the upper and lower smooth metal inserts or sections 31' to compensate for and take up the taper of the fuselage and present the corrugated portions in continuation of those formed by sections 30 and disposed longitudinally of the fuselage.

A modified construction and arrangement of the skin or covering of the type of Fig. 7 is disclosed by Fig. 8 in which the tapered oval fuselage F'''' is formed of the corrugated upper and lower sections 40 having a constant number of corrugations throughout their length and disposed with the corrugations extending longitudinally of the fuselage, the forwardly increasing gaps or spaces between the spaced longitudinal edges of the corrugations at opposite sides of the fuselage being filled in and taken up by the smooth metal inserts or sections 41 which are connected with corrugated sections 40 to form the longitudinal seams 42. The construction of Fig. 8 is similar to that described with reference to Fig. 7 with the exception of the location of the smooth metal inserts at opposite sides of the fuselage, and with the construction of Fig. 8 the moment of inertia should be higher than that of the construction of Fig. 7.

By the foregoing arrangement and constructions of corrugated metal skins or coverings for aircraft bodies and similar elements of tapering or varying sectional forms, those difficulties heretofore encountered in the construction and application of corrugated metal sheet to tapered or varying section elements are eliminated. The cost of production in both time and labor is reduced over the conventional constructions and arrangements for corrugated skins or coverings and by the inclusion of the smooth sheet to take up and compensate for taper or varying section the problem of longitudinal seams between non-matching corrugations is efficiently provided for and taken care of.

It is also evident that various changes, modifications, substitutions and variations might be resorted to without departing from the spirit and scope of our invention and hence we do not wish to limit ourselves to the exact and specific disclosures hereof.

Desiring to protect our invention in the broadest manner legally possible, what we claim is:

1. In a tapered aircraft element, a metal skin or covering therefor including sections of corrugated metal sheet each formed with the same number of corrugations of the same pitch, said sheets joined together with the corrugations matching and in alinement to provide a series of corrugations disposed longitudinally of the element, and non-corrugated metal sheet joined with said corrugated sheet to complete the covering.

2. In a tapered aircraft element, a metal skin or covering therefor formed with a series of corrugations disposed longitudinally of the element and constant in number, and formed smooth between said series of corrugations to compensate for the element taper.

3. In a tapered aircraft element, a skin or covering therefor comprising sections of corrugated sheet each formed with the same number of corrugations, said corrugated sheet applied to the element in position with the corrugations thereof matched and alined longitudinally of the element, and smooth sheet applied between and connecting the space due to the element taper between the longitudinal edges of the corrugated sheets to form and complete the skin.

4. In a tapered aircraft element, a skin or covering therefor embodying a series of corrugated sheets applied longitudinally of the element with the corrugations thereof constant in number and total width and alined longitudinally of the element, and smooth sheet connecting the corrugated sections to fill the space between the longitudinal edges due to the element taper and complete the skin or covering.

5. In a tapered aircraft element of the monocoque type, a skin or covering therefor embodying a series of corrugated sections of a width substantially equal to the perimeter of the element at a given rearward point thereon and each formed with the same number of corrugations, said sections applied longitudinally of the element and extending forwardly from the given point thereon with their edges joined and the corrugations thereof alined longitudinally of the element, and smooth sections applied in lateral continuation of the corrugated sections to take up and compensate for the increase in width forwardly of the element due to the taper thereof.

6. In a tapered aircraft body, a skin or covering therefor formed for the major portion of its length of both corrugated and smooth sheet, the corrugations disposed longitudinally of the body and the smooth portion of the skin compensating for the body taper.

7. In a tapered aircraft body, a skin or covering therefor formed of corrugated and smooth portions, the corrugations of constant pitch and number for a given length and disposed longitudinally in the direction of taper, with the smooth portion compensating for the body taper.

8. In a tapered aircraft element, a covering therefor formed of corrugated sheet and smooth sheet so arranged and joined together thereon that the corrugated sheet provides a portion of the covering formed with corrugations disposed longitudinally of the element and constant in number for a given length, and the smooth sheet provides the remaining portion of the covering.

9. In a tapered aircraft element, a covering therefor having a corrugated portion providing corrugations disposed longitudinally of the element and constant in number throughout a given length, and the portion of the covering between and connecting said corrugated portion to complete the covering formed without such corrugations and compensating for the element taper.

Signed at Ithaca, county of Tompkins, State of New York, this 24th day of May, 1926.

RANDOLPH F. HALL.
C. AINSLEY PHILLIPS